(12) United States Patent
Kawasaki et al.

(10) Patent No.: US 8,807,155 B2
(45) Date of Patent: Aug. 19, 2014

(54) CONTROL DEVICE FOR HYBRID CONSTRUCTION MACHINE

(75) Inventors: Haruhiko Kawasaki, Atsugi (JP); Masahiro Egawa, Kawaguchi (JP)

(73) Assignee: Kayaba Industry Co., Ltd., Tokyo (JP)

( * ) Notice: Subject to any disclaimer, the term of this patent is extended or adjusted under 35 U.S.C. 154(b) by 591 days.

(21) Appl. No.: 13/133,412

(22) PCT Filed: Apr. 22, 2010

(86) PCT No.: PCT/JP2010/057637
§ 371 (c)(1),
(2), (4) Date: Jun. 8, 2011

(87) PCT Pub. No.: WO2010/128645
PCT Pub. Date: Nov. 11, 2010

(65) Prior Publication Data
US 2011/0240146 A1    Oct. 6, 2011

(30) Foreign Application Priority Data

May 8, 2009    (JP) .................. 2009-113856

(51) Int. Cl.
| | | |
|---|---|---|
| *F15B 21/08* | (2006.01) | |
| *E02F 9/20* | (2006.01) | |
| *B60W 30/188* | (2012.01) | |
| *E02F 9/22* | (2006.01) | |
| *F15B 21/14* | (2006.01) | |
| *B60W 10/30* | (2006.01) | |
| *B60K 6/20* | (2007.10) | |

(52) U.S. Cl.
CPC .......... *E02F 9/2025* (2013.01); *F15B 2211/85* (2013.01); *B60K 6/20* (2013.01); *F15B 21/082* (2013.01); *F15B 2211/6346* (2013.01); *F15B 2211/7142* (2013.01); *E02F 9/2075* (2013.01); *F15B 2211/665* (2013.01); *F15B 2211/7058* (2013.01); *F15B 2211/6652* (2013.01); *B60W 30/188* (2013.01); *F15B 2211/20576* (2013.01); *F15B 2211/7135* (2013.01); *E02F 9/2296* (2013.01); *F15B 21/14* (2013.01); *E02F 9/2235* (2013.01); *F15B 2211/20553* (2013.01); *F15B 2211/6658* (2013.01); *B60W 10/30* (2013.01); *E02F 9/2217* (2013.01); *F15B 2211/45* (2013.01); *F15B 2211/31535* (2013.01)

USPC ............ 137/115.25; 137/565.14; 137/565.16; 60/452; 701/50

(58) Field of Classification Search
CPC ..... E02F 9/2075; E02F 9/2285; E02F 9/2289; E02F 9/2292; E02F 9/2296; F15B 2211/50536; F15B 2211/50554; F15B 2211/51; F15B 2211/5157; F15B 2211/526
USPC ......... 701/36, 50; 60/422, 450, 452; 137/102, 137/110, 115.13, 115.25, 565.13, 565.14, 137/565.16
See application file for complete search history.

(56) References Cited

U.S. PATENT DOCUMENTS

| | | | |
|---|---|---|---|
| 5,421,155 A | 6/1995 | Hirata et al. | |
| 5,680,760 A * | 10/1997 | Lunzman | 60/426 |
| 6,820,356 B2 * | 11/2004 | Naruse et al. | 37/348 |
| 6,851,207 B2 * | 2/2005 | Yoshimatsu | 37/348 |
| 2005/0210871 A1 * | 9/2005 | Lech et al. | 60/422 |
| 2005/0246082 A1 * | 11/2005 | Miki et al. | 701/50 |
| 2007/0129862 A1 * | 6/2007 | Kim et al. | 701/36 |

FOREIGN PATENT DOCUMENTS

| | | |
|---|---|---|
| JP | 6-117409 | 4/1994 |
| JP | 9-317703 | 12/1997 |
| JP | 2002-275945 | 9/2002 |
| JP | 200349810 | 2/2003 |
| JP | 2005-140143 | 6/2005 |
| JP | 2007-327527 A | 12/2007 |
| JP | 2009287344 | 12/2009 |
| JP | 2009287745 | 12/2009 |
| WO | WO-94/04828 | 3/1994 |
| WO | WO-2009145054 | 12/2009 |

OTHER PUBLICATIONS

German Office Action dated Jun. 4, 2013 with English translation.

* cited by examiner

*Primary Examiner* — William McCalister
(74) *Attorney, Agent, or Firm* — Rabin & Berdo, P.C.

(57) ABSTRACT

A regulator that performs control such that a tilt angle of a variable volume pump increases as a pilot pressure in a pilot flow passage decreases is provided, and when a controller determines that all of a plurality of operation valves for controlling a flow of a discharged oil that is led from the variable volume pump to respective actuators are in a neutral position, the controller supplies the discharged oil from the variable volume pump to a regenerative hydraulic motor by setting a solenoid valve in an open position and sets a pilot flow passage change-over solenoid valve in a blocking position such that the pilot pressure led to the regulator through the pilot flow passage is reduced by a pressure reducing valve.

7 Claims, 4 Drawing Sheets

US 8,807,155 B2

CONTROL DEVICE FOR HYBRID CONSTRUCTION MACHINE

TECHNICAL FIELD

This invention relates to a control device for a hybrid construction machine that uses an electric motor as a drive source.

BACKGROUND ART

A hybrid structure employed in a construction machine such as a power shovel generates power by rotating a power generator using excess power from an engine, stores the generated power in a battery, and operates an actuator by driving an electric motor using power from the battery, for example. Further, the hybrid structure generates power by rotating the power generator using discharged energy from the actuator, stores the generated power in the battery, and operates the actuator by driving the electric motor using power from the battery (see JP2002-275945A).

In a power shovel or the like, the engine is maintained in a rotating condition even when the actuator is stopped. At such times, a pump rotates together with the engine, and therefore the pump discharges a so-called standby flow.

DISCLOSURE OF THE INVENTION

In the conventional hybrid structure described above, the standby flow discharged by the pump is simply returned to a tank when the actuator is stopped, and therefore the standby flow is not used effectively.

This invention has been designed in consideration of the problem described above, and an object thereof is to provide a control device for a hybrid construction machine that achieves energy regeneration by making effective use of a standby flow from a pump to exhibit a power generation function.

This invention is a control device for a hybrid construction machine. The control device for a hybrid construction machine comprises a variable volume pump; a plurality of operation valves for controlling a flow of a discharged oil that is led from the variable volume pump to respective actuators; a neutral flow passage for leading the discharged oil from the variable volume pump to a tank when the operation valves are in a neutral position; a pilot pressure generating throttle provided in the neutral flow passage on a downstream side of the operation valves; a pilot flow passage into which a pressure generated on an upstream side of the pilot pressure generating throttle is led; a regulator for performing control such that a tilt angle of the variable volume pump increases as a pilot pressure in the pilot flow passage decreases; an operation condition detector for detecting an operation condition of the operation valves; a regenerative hydraulic motor rotated by the discharged oil from the variable volume pump; a solenoid valve for opening and closing a flow passage connecting the variable volume pump to the hydraulic motor; a power generator connected to the hydraulic motor; a pilot flow passage change-over solenoid valve for switching the neutral flow passage and the pilot flow passage between a communicating state and a blocked state; a pressure reducing valve for reducing the pilot pressure led to the regulator through the pilot flow passage when the neutral flow passage and the pilot flow passage are blocked by the pilot flow passage change-over solenoid valve; and a controller that determines whether or not all of the operation valves are in the neutral position on the basis of a detection result from the operation condition detector, and when all of the operation valves are determined to be in the neutral position, supplies the discharged oil from the variable volume pump to the hydraulic motor by setting the solenoid valve in an open position and sets the pilot flow passage change-over solenoid valve in a blocking position.

According to this invention, in a state where all of the operation valves are in the neutral position such that the variable volume pump discharges a standby flow, the discharged oil from the variable volume pump is supplied to the regenerative hydraulic motor via the solenoid valve, and therefore the standby flow from the variable volume pump can be used effectively. Further, during a regeneration operation in which the discharged oil from the variable volume pump is supplied to the hydraulic motor, the pilot flow passage change-over solenoid valve is set in the blocking position and the pilot pressure that has been reduced by the pressure reducing valve is led to the regulator for controlling the tilt angle of the variable volume pump, and therefore the tilt angle of the variable volume pump is maintained at a large angle. Hence, the flow of the discharged oil supplied to the hydraulic motor from the variable volume pump increases, and as a result, an amount of recovered energy can be increased.

EMBODIMENTS OF THE INVENTION

A control device for a hybrid construction machine according to embodiments of this invention will be described below with reference to the figures. In the following embodiments, cases in which the hybrid construction machine is a power shovel will be described.

(First Embodiment)

Figure 1:
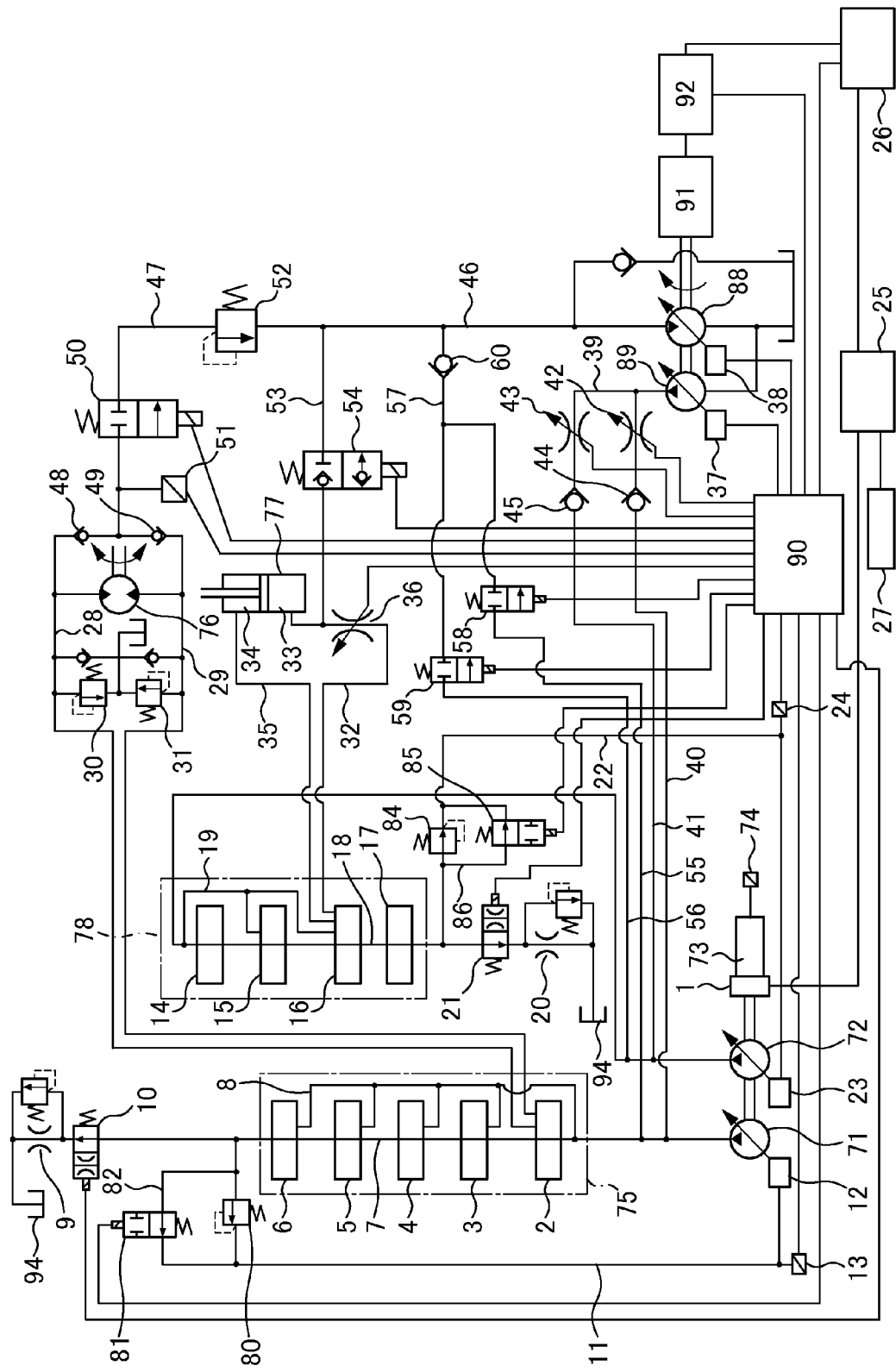
FIG. 1 is a circuit diagram of a control device for a hybrid construction machine according to a first embodiment of this invention.

Referring to FIG. 1, a first embodiment will be described.

A power shovel is provided with variable capacity first and second main pumps 71, 72 driven by an engine 73 serving as a prime mover. The first and second main pumps 71, 72 rotate coaxially. The engine 73 is provided with a generator 1 that exhibits a power generation function using a surplus power of the engine 73. The engine 73 is further provided with a rotation speed sensor 74 that serves as a rotation speed detector for detecting a rotation speed of the engine 73.

A working oil discharged from the first main pump 71 is supplied to a first circuit system 75. The first circuit system 75 comprises, in order from an upstream side, an operation valve 2 for controlling a turning motor 76, an operation valve 3 for controlling an arm cylinder (not shown), a boom two-speed operation valve 4 for controlling a boom cylinder 77, an operation valve 5 for controlling a preparatory attachment (not shown), and an operation valve 6 for controlling a leftward travel first travel motor (not shown). The respective operation valves 2 to 6 control operations of respective actuators by controlling a flow of oil discharged from the first main pump 71 and led to the respective actuators.

The respective operation valves 2 to 6 and the first main pump 71 are connected via a neutral flow passage 7 and a parallel flow passage 8 that is parallel to the neutral flow passage 7. A throttle 9 for generating a pilot pressure is provided in the neutral flow passage 7 on a downstream side of the first travel motor operation valve 6. The throttle 9 generates a higher pilot pressure on an upstream side thereof as a flow passing through the throttle 9 increases, and generates a lower pilot pressure on the upstream side as the flow passing through the throttle 9 decreases.

When all of the operation valves 2 to 6 are in or in the vicinity of a neutral position, the neutral flow passage 7 leads all or a part of the working oil discharged from the first main pump 71 to a tank 94 via the throttle 9. At this time, the flow passing through the throttle 9 is large, and therefore a high pilot pressure is generated.

When the operation valves 2 to 6 are switched to a full stroke condition, on the other hand, the neutral flow passage 7 is closed such that the flow of fluid stops. In this case, the flow passing through the throttle 9 substantially disappears, and therefore the pilot pressure is held at zero. Depending on operation amounts of the operation valves 2 to 6, however, a part of the working oil discharged from the first main pump 71 is led to the actuators while the remainder is led from the neutral flow passage 7 to the tank, and therefore the throttle 9 generates a pilot pressure corresponding to the flow of the working oil through the neutral flow passage 7. In other words, the throttle 9 generates a pilot pressure that corresponds to the operation amount of the operation valves 2 to 6.

A neutral flow passage change-over solenoid valve 10 is provided in the neutral flow passage 7 between the furthest downstream operation valve 6 and the throttle 9. A solenoid of the neutral flow passage change-over solenoid valve 10 is connected to a controller 90. When the solenoid is not excited, the neutral flow passage change-over solenoid valve 10 is set in a fully open position shown in the figure by a spring force action of a spring, and when the solenoid is excited, the neutral flow passage change-over solenoid valve 10 is set in a throttle position against the spring force of the spring. A throttle opening obtained when the neutral flow passage change-over solenoid valve 10 is switched to the throttle position is set to be smaller than an opening of the throttle 9.

A pilot flow passage 11 is connected to the neutral flow passage 7 between the operation valve 6 and the neutral flow passage change-over solenoid valve 10. A pressure generated on the upstream side of the throttle 9 is led to the pilot flow passage 11 as the pilot pressure. The pilot flow passage 11 is connected to a regulator 12 for controlling a tilt angle of the first main pump 71. The regulator 12 controls a displacement volume per revolution of the first main pump 71 by controlling the tilt angle of the first main pump 71 in inverse proportion to the pilot pressure in the pilot flow passage 11. Accordingly, when the operation valves 2 to 6 are set at full stroke such that the flow through the neutral flow passage 7 stops and the pilot pressure in the pilot flow passage 11 decreases to zero, the tilt angle of the first main pump 71 reaches a maximum, leading to a maximum displacement volume per revolution.

A pressure reducing valve 80 and a pilot flow passage change-over solenoid valve 81 are provided in parallel in the pilot flow passage 11. The pilot flow passage change-over solenoid valve 81 is provided in a bypass flow passage 82 that bypasses the pressure reducing valve 80. When a solenoid thereof is not excited, the pilot flow passage change-over solenoid valve 81 is set in a communicating position shown in the figure, whereby the working oil led from the neutral flow passage 7 to the pilot flow passage 11 bypasses the pressure reducing valve 80. When the solenoid is excited, on the other hand, the pilot flow passage change-over solenoid valve 81 is set in a blocking position such that the neutral flow passage 7 communicates with the pilot flow passage 11 via only the pressure reducing valve 80. Hence, the pilot flow passage change-over solenoid valve 81 switches the neutral flow passage 7 and the pilot flow passage 11 between a blocked state and a communicating state.

In a case where the neutral flow passage 7 communicates with the pilot flow passage 11 while bypassing the pressure reducing valve 80 when all of the operating valves 2 to 6 are in the neutral position and the neutral flow passage change-over solenoid valve 10 is in the fully open position, the pressure on the upstream side of the throttle 9 acts directly on the regulator 12 as the pilot pressure. In a case where the pressure on the upstream side of the throttle 9 acts directly on the regulator 12 in this manner when all of the operation valves 2 to 6 are in the neutral position, the first main pump 71 discharges a standby flow while maintaining a minimum tilt angle.

When the pilot flow passage change-over solenoid valve 81 is switched to the blocking position such that the neutral flow passage 7 communicates with the pilot flow passage 11 via the pressure reducing valve 80, on the other hand, the pilot pressure led to the regulator 12 is reduced by the pressure reducing valve 80. Hence, when the pilot flow passage change-over solenoid valve 81 is in the blocking position, the pilot pressure acting on the regulator 12 is lower than when the pilot flow passage change-over solenoid valve 81 is in the communicating position by an amount corresponding to the pressure reduction performed by the pressure reducing valve 80. Accordingly, the tilt angle of the first main pump 71 increases, leading to a relative increase in the displacement volume per revolution of the first main pump 71.

A first pressure sensor 13 serving as a pressure detector for detecting the pressure in the pilot flow passage 11 is provided in the pilot flow passage 11. A signal indicating the pressure detected by the first pressure sensor 13 is output to the controller 90. The pilot pressure in the pilot flow passage 11 varies in accordance with the operation amount of the operating valves 2 to 6, and therefore the pressure signal output by the first pressure sensor 13 varies in accordance with a required flow of the first circuit system 75.

Further, the controller 90 determines whether or not all of the operation valves 2 to 6 are in the neutral position in accordance with the pressure signal output by the first pressure sensor 13. More specifically, a pressure generated upstream of the throttle 9 when all of the operation valves 2 to 6 are in the neutral position is stored in advance in the controller 90 as a set pressure. Therefore, when the pressure signal from the first pressure sensor 13 reaches the set pressure, the controller 90 can determine that all of the operation valves 2 to 6 are in the neutral position and the actuators connected thereto are inoperative. Hence, the controller 90 determines whether or not all of the operation valves 2 to 6 are in the neutral position on the basis of the pressure detected by the first pressure sensor 13.

The first pressure sensor 13 that detects the pilot pressure in the pilot flow passage 11 corresponds to an operation condition detector for detecting an operation condition of the operation valves 2 to 6. The operation condition detector according to this invention is not limited to the first pressure sensor. For example, a sensor that serves as a position detector for detecting the neutral positions of the respective operation valves 2 to 6 may be provided as the operation condition detector. In this case, the controller 90 determines whether or not all of the operation valves 2 to 6 are in the neutral position on the basis of a detection result from this sensor.

The second main pump 72 is connected to a second circuit system 78. The second circuit system 78 comprises, in order from an upstream side, an operation valve 14 for controlling a rightward travel second travel motor (not shown), an operation valve 15 for controlling a bucket cylinder (not shown), an operation valve 16 for controlling the boom cylinder 77, and an arm two-speed arm operation valve 17 for controlling the arm cylinder (not shown). A sensor for detecting an operation direction and an operation amount is provided in the operation valve 16, and a detection signal from this sensor is output to the controller 90. The operation valves 14 to 17 control operations of respective actuators by controlling a flow of oil discharged from the second main pump 72 and led to the respective actuators.

The respective operation valves 14 to 17 and the second main pump 72 are connected via a neutral flow passage 18 and a parallel flow passage 19 that is parallel to the neutral flow passage 18. A throttle 20 for generating a pilot pressure is provided in the neutral flow passage 18 on a downstream side of the operation valve 17. The throttle 20 has an identical function to the throttle 9 on the first main pump 71 side.

A neutral flow passage change-over solenoid valve 21 is provided in the neutral flow passage 18 between the furthest downstream operation valve 17 and the throttle 20. The neutral flow passage change-over solenoid valve 21 has an identical constitution to the neutral flow passage change-over solenoid valve 10 on the first main pump 71 side.

A pilot flow passage 22 is connected to the neutral flow passage 18 between the operation valve 17 and the neutral flow passage change-over solenoid valve 21. A pressure generated on the upstream side of the throttle 20 is led to the pilot flow passage 22 as the pilot pressure. The pilot flow passage 22 is connected to a regulator 23 for controlling a tilt angle of the second main pump 72.

A pressure reducing valve 84 and a pilot flow passage change-over solenoid valve 85 are provided in parallel in the pilot flow passage 22. The pilot flow passage change-over solenoid valve 85 is provided in a bypass flow passage 86 that bypasses the pressure reducing valve 84. The regulator 23, the pressure reducing valve 84, and the pilot flow passage change-over solenoid valve 85 are constituted and operated identically to the regulator 12, the pressure reducing valve 80, and the pilot flow passage change-over solenoid valve 81 on the first main pump 71 side, and therefore description thereof has been omitted.

Flow passages 55, 56 are connected to the first and second main pumps 71, 72, respectively, and solenoid valves 58, 59 are provided in the flow passages 55, 56, respectively. The flow passages 55, 56 are connected to the first and second main pumps 71, 72 on an upstream side of the first and second circuit systems 75, 78. Solenoids of the solenoid valves 58, 59 are connected to the controller 90. When the solenoids are not excited, the solenoid valves 58, 59 are set in a closed position shown in the figure, and when the solenoids are excited, the solenoid valves 58, 59 are set in an open position.

The solenoid valves 58, 59 are connected to a hydraulic motor 88 via a confluence passage 57 and a check valve 60. The hydraulic motor 88 rotates in coordination with a power generator 91, and power generated by the power generator 91 is charged to a battery 26 via an inverter 92. It should be noted that the hydraulic motor 88 and the power generator 91 may be coupled directly or via a reduction gear.

When any one of the operation valves in the first and second circuit systems 75, 78, for example one of the operation valves of the first circuit system 75, is switched such that the actuator connected to the operation valve is operated, the flow flowing through the neutral flow passage 7 varies in accordance with the operation amount of the operation valve. Further, the pilot pressure generated on the upstream side of the pilot pressure generating throttle 9 varies in accordance with the flow of the working oil flowing through the neutral flow passage 7. The regulator 12 controls the tilt angle of the first main pump 71 in accordance with the pilot pressure. More specifically, as the pilot pressure decreases, the tilt angle is increased, leading to an increase in the displacement volume of the first main pump 71 per revolution. Conversely, as the pilot pressure increases, the tilt angle is reduced, leading to a reduction in the displacement volume of the first main pump 71 per revolution. An identical action is performed in relation to the second main pump 72 and the second circuit system 78.

To charge the battery 26 by rotating the hydraulic motor 88, an operator inputs a standby regeneration command signal into the controller 90 through a manual operation. In a state where the operator has not input the standby regeneration command signal, the controller 90 maintains all of the neutral flow passage change-over solenoid valves 10, 21, pilot flow passage change-over solenoid valves 81, 85, and solenoid valves 58, 59 in a normal position shown in the figure. In this state, the tilt angles of the first and second main pumps 71, 72 are controlled by the pressure on the upstream side of the pilot pressure generating throttles 9, 20. Hence, when all of the operation valves 2 to 6, 14 to 17 are held in the neutral position in this state, the pilot pressure led to the pilot flow passages 11, 22 reaches a maximum. When the pilot pressure is at a maximum, the regulators 12, 23 control the displacement volume per revolution of the first and second main pumps 71, 72 to a minimum by reducing the tilt angle of the first and second main pumps 71, 72, and therefore the first and second main pumps 71, 72 discharge the standby flow.

Figure 2:
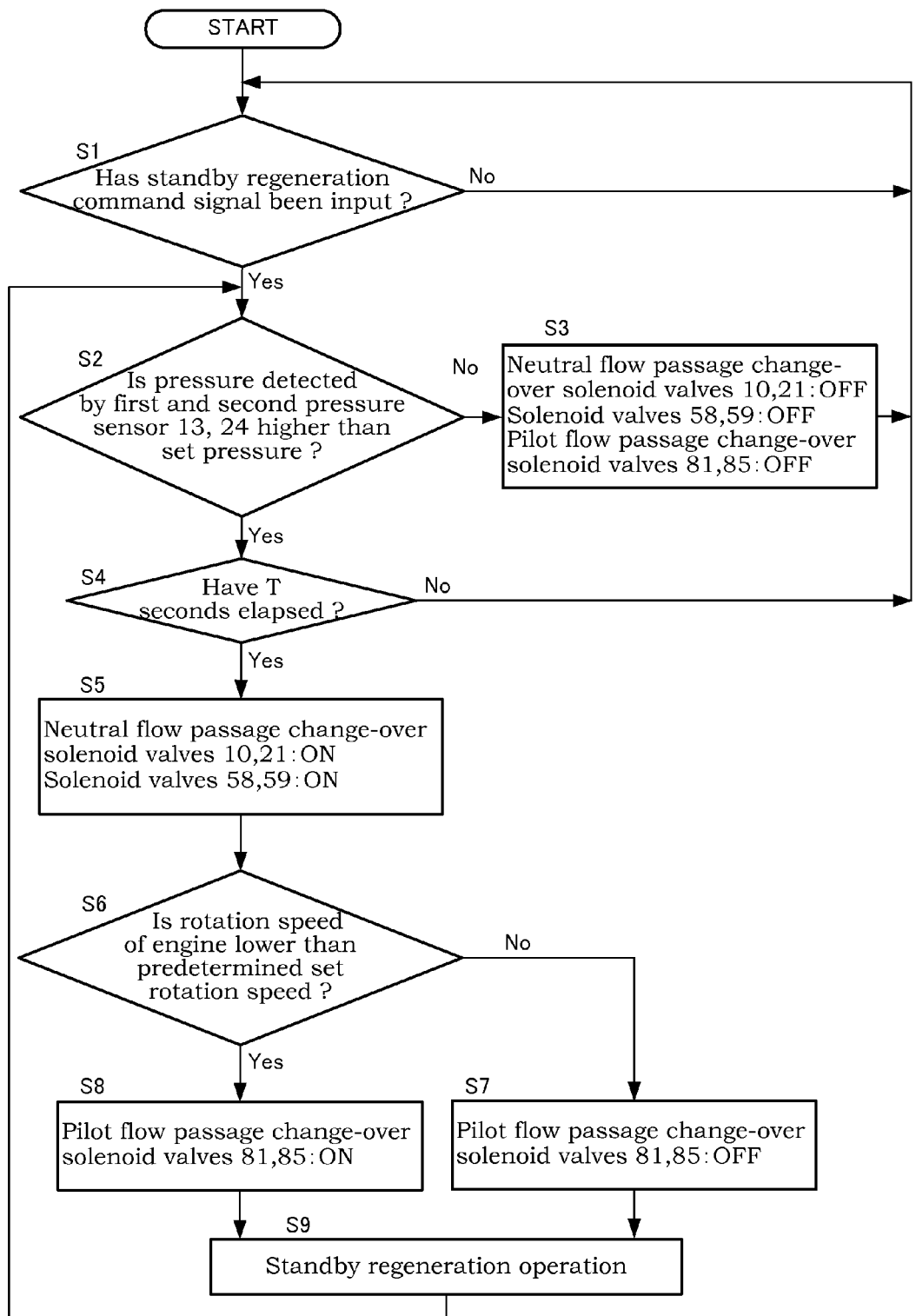
FIG. 2 is a flowchart showing a control procedure employed during regeneration.

Next, referring to FIG. 2, a case in which the operator performs a manual operation to input the standby regeneration command signal into the controller 90 will be described. A control procedure shown in FIG. 2 is executed by the controller 90. A CPU that controls processing operations of the entire control device, a ROM that stores programs, data and so on required for the processing operations of the CPU, a RAM that stores data read from the ROM, data read by various measuring instruments, and so on temporarily, and so on are housed in the controller 90.

In a step 1, a determination is made as to whether or not a standby regeneration command signal has been input through a manual operation by the operator. When it is determined that a standby regeneration command signal has been input, the routine advances to a step 2.

In the step 2, a determination is made as to whether or not the pressure detected by the first and second pressure sensor 13, 24 is equal to or higher than the set pressure. When it is determined that the detected pressure is lower than the set pressure, it is determined that one of the operation valves 2 to 6, 14 to 17 of the first and second circuit systems 75, 78 is not in the neutral position and that the corresponding actuator is operative, and therefore the routine advances to a step 3.

In the step 3, the neutral flow passage change-over solenoid valves 10, 21, the solenoid valves 58, 59, and the pilot flow passage change-over solenoid valves 81, 85 are held in the normal position and the routine returns to the step 1.

When it is determined in the step 2 that the pressure detected by the first and second pressure sensor 13, 24 is equal to or higher than the set pressure, it is determined that all of the operation valves 2 to 6, 14 to 17 are in the neutral position and the actuators thereof are inoperative, and therefore the routine advances to a step 4.

In the step 4, a determination is made as to whether or not the state in which the detected pressure is equal to or higher than the set pressure has been established for T seconds. If the pressure detected by the first and second pressure sensors 13, 24 falls below the set pressure before the elapse of T seconds, the routine returns to the step 1. When the state in which the detected pressure is equal to or higher than the set pressure has been established for T seconds, on the other hand, the routine advances to a step 5.

In the step 5, the solenoids of the neutral flow passage change-over solenoid valves 10, 21 and the solenoid valves 58, 59 are excited such that the neutral flow passage change-over solenoid valves 10, 21 are switched to the throttle position and the solenoid valves 58, 59 are switched to the open position. As a result, the working oil discharged from the first and second main pumps 71, 72 is supplied to the hydraulic motor 88 through the flow passages 55, 56 and the confluence passage 57.

In a step 6, a determination is made as to whether or not the rotation speed of the engine 73 detected by the rotation speed sensor 74 is equal to or lower than a predetermined set rotation speed. This set rotation speed is stored in advance in the ROM of the controller 90. When it is determined that the engine rotation speed is not equal to or lower than the set rotation speed, i.e. that the engine rotation speed exceeds the set rotation speed, the routine advances to a step 7. In the step 7, the solenoids of the pilot flow passage change-over solenoid valve 81, 85 are maintained in a non-excited condition such that the pilot flow passage change-over solenoid valves 81, 85 are held in the open position. As a result, the pilot pressure in the pilot flow passages 11, 22 is led to the regulators 12, 23 through the pilot flow passage change-over solenoid valves 81, 85 and the pilot flow passages 11, 22. Accordingly, the first and second main pumps 71, 72 are held at the tilt angle for discharging the standby flow. Hence, when the engine rotation speed is high, the pilot flow passage change-over solenoid valves 81, 85 are held in the open position and the first and second main pumps 71, 72 are held at the tilt angle for discharging the standby flow. The reason for this is that when the engine rotation speed is high, the first and second main pumps 71, 72 can secure a predetermined discharge amount even if the displacement volume per revolution is small.

Meanwhile, when it is determined in the step 6 that the engine rotation speed is equal to or lower than the set rotation speed, the routine advances to a step 8. In the step 8, the solenoids of the pilot flow passage change-over solenoid valves 81, 85 are excited such that the pilot flow passage change-over solenoid valves 81, 85 are switched to the closed position. As a result, the pilot pressure in the pilot passages 11, 22 is reduced by the pressure reducing valves 80, 84 and then led to the regulators 12, 23. Accordingly, the tilt angles of the first and second main pumps 71, 72 increase beyond the tilt angle for discharging the standby flow, leading to an increase in the displacement volume per revolution, and therefore a predetermined discharge amount can be secured even though the engine rotation speed is low.

In both the step 7 and the step 8, the working oil discharged from the first and second main pumps 71, 72 is supplied to the hydraulic motor 88 via the solenoid valves 58, 59. The power generator 91 is rotated by a driving force from the hydraulic motor 88, and as a result, power is generated (step 9). The power generated by the power generator 91 is charged to the battery 26 via the inverter 92. Hence, regeneration is performed using the standby flow discharged by the first and second main pumps 71, 72 in the manner described above.

As the hydraulic motor 88 rotates, the routine returns to the step 2, from which the control flow is repeated. When one of the operation valves 2 to 6, 14 to 17 is operated during the repeated processing such that the pilot pressure in the pilot flow passages 11, 22 is determined to be lower than the set pressure in the step 2, the corresponding actuator is determined to be operative, and therefore the routine advances to the step 3 and then returns to the step 1 from the step 3. In the step 3, the respective solenoids of the neutral flow passage change-over solenoid valves 10, 21, the solenoid valves 58, 59, and the pilot flow passage change-over solenoid valves 81, 85 are switched to the non-excited state, whereby these valves are returned to their normal positions. As a result, the flow of working oil from the first and second main pumps 71, 72 to the hydraulic motor 88 is blocked and the standby regeneration operation is halted. Further, the regulators 12, 23 align the tilt angles of the first and second main pumps 71, 72 with a required flow corresponding to the operation amount of the operation valves 2 to 6, 14 to 17.

In a case where the neutral flow passage change-over solenoid valves 10, 21 are change-over valves having a fully open position and a fully closed position rather than a fully open position and a throttle position, the neutral flow passage change-over solenoid valves 10, 21 are set in the fully closed position during the standby regeneration operation and switched from the fully closed position to the fully open position when one of the operation valves 2 to 6, 14 to 17 is switched from the neutral position such that the corresponding actuator is operated (step 3). During the switch, the pressure in the pilot flow passages 11, 22 decreases only by an oil leakage amount, and therefore the tilt angles of the first and second main pumps 71, 72 do not increase smoothly. As a result, a large amount of time is required for the discharge amounts of the first and second main pumps 71, 72 to return to a flow that is commensurate with the switch amount of the operation valve 2 to 6, 14 to 17. In the first embodiment, however, the neutral flow passage change-over solenoid valves 10, 21 are change-over valves having a fully open position and a throttle position, and therefore, when the neutral flow passage change-over solenoid valves 10, 21 are switched from the throttle position to the fully open position, the pressure in the pilot flow passages 11, 22 escapes rapidly through the throttle. Hence, when one of the operation valves 2 to 6, 14 to 17 is switched from the neutral position such that the corresponding actuator is operated, a large amount of time is not required for the discharge amounts of the first and second main pumps 71, 72 to return to the flow that is commensurate with the switch amount of the operation valve 2 to 6, 14 to 17.

In the control flow shown in FIG. 2, the determination as to whether or not to reduce the pilot pressure in the pilot flow passages 11, 22 using the pressure reducing valves 80, 84 (steps 7, 8) is made in accordance with the engine rotation speed (step 6). However, the steps 6 to 8 may be omitted such that when the state in which the detected pressure is equal to or higher than the set pressure has been established for T seconds in the step 4, the respective solenoids of the neutral flow passage change-over solenoid valves 10, 21, the solenoid valves 58, 59, and the pilot flow passage change-over solenoid valves 81, 85 are excited in the step 5. In other words, the pilot pressure in the pilot flow passages 11, 22 may be reduced by the pressure reducing valves 80, 84 regardless of the engine rotation speed.

According to the first embodiment described above, the following actions and effects are obtained.

In a state where the first and second main pumps 71, 72 discharge the standby flow while the operation valves 2 to 6, 14 to 17 for controlling the flow of the oil discharged from the first and second main pumps 71, 72 and led to the respective actuators are in the neutral position, the pilot pressure reduced by the pressure reducing valves 80, 84 is led to the regulators 12, 23. As a result, the tilt angles of the first and second main pumps 71, 72 are held at a larger angle than the minimum angle. By maintaining a large tilt angle, the displacement volume per revolution of the first and second main pumps 71, 72 is increased beyond that of the minimum tilt angle.

Hence, sufficient energy for charging the battery 26 is secured. Furthermore, the first and second main pumps 71, 72 can be used when the displacement volume is increased, and therefore improvements in pump efficiency and overall energy efficiency are obtained. Further, since the displacement volume per revolution can be increased, sufficient energy for charging the battery 26 can be secured without raising a pump rotation speed. As a result, the rotation speed of the engine serving as the prime mover need not be raised, enabling a reduction in energy consumption and a reduction in noise caused by engine sound.

(Second Embodiment)

Figure 3:
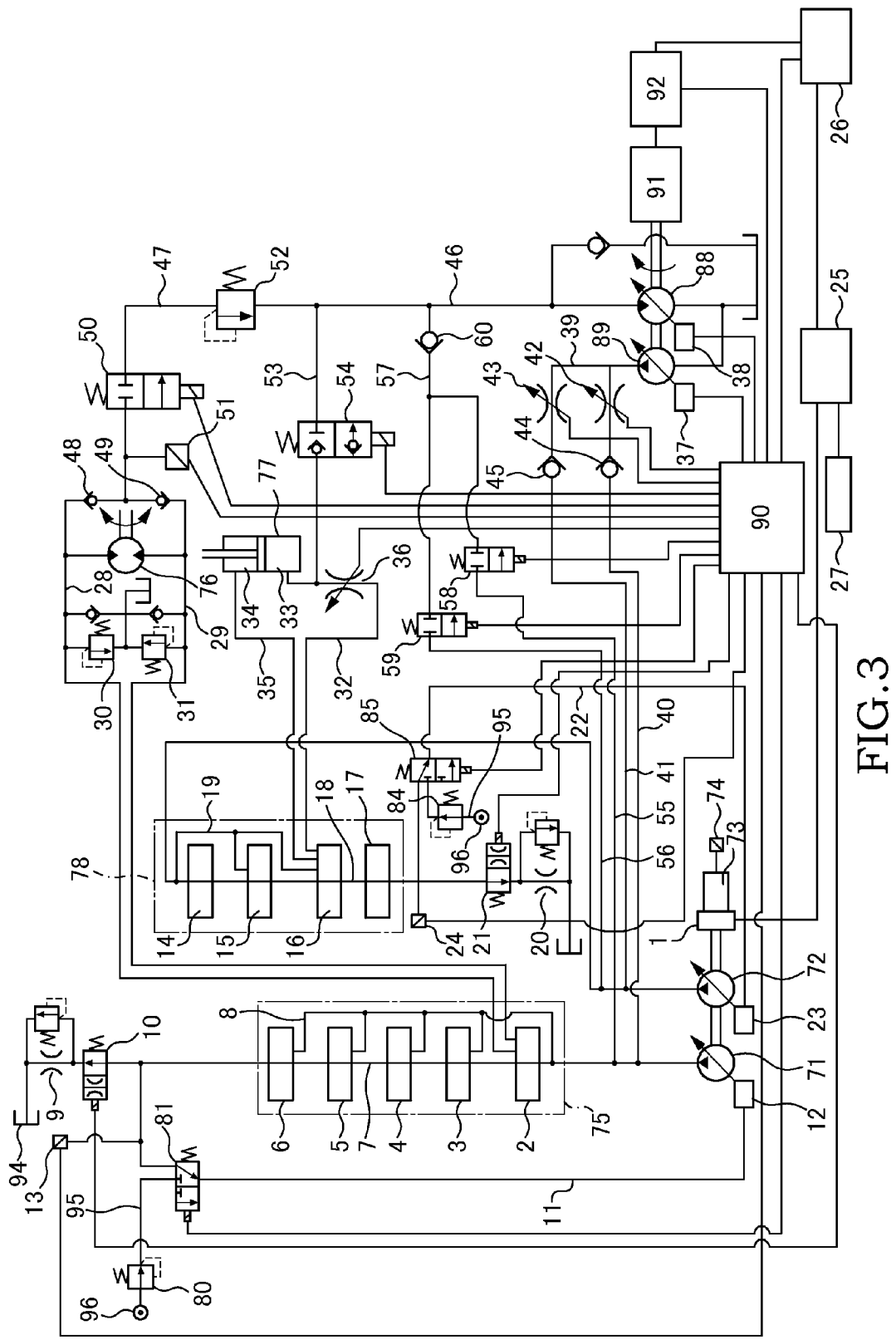
FIG. 3 is a circuit diagram of a control device for a hybrid construction machine according to a second embodiment of this invention.

Referring to FIG. 3, a second embodiment will be described. Differences with the first embodiment will be described below.

In the second embodiment, the pilot flow passage change-over solenoid valve 81, 85 is constituted differently to that of the first embodiment. Further, a sub-pilot flow passage 95 is connected to the pilot flow passage 11, 22 and a pilot pump 96 serving as a pilot pressure source for supplying a pilot pressure oil through the pilot flow passage 11, 22 is connected to the sub-pilot flow passage 95. Furthermore, the first and second pressure sensors 13, 24 are provided upstream of the pilot flow passage change-over solenoid valves 81, 85. All other constitutions are identical to the counterparts in the first embodiment and description thereof has been omitted.

The pilot flow passage change-over solenoid valve 81, 85 is provided in the pilot flow passage 11, 22 and can be switched between a first position and a second position. The pilot flow passage change-over solenoid valve 81, 85 is set in the first position in a normal state when the solenoid thereof is not excited and set in the second position when the solenoid is excited. In the first position, the pilot flow passage 11, 22 communicates with the neutral flow passage 7, 18 while communication between the pilot flow passage 11, 22 and the sub-pilot flow passage 95 is blocked. In the second position, on the other hand, the pilot flow passage 11, 22 communicates with the sub-pilot flow passage 95 while communication between the pilot flow passage 11, 22 and the neutral flow passage 7, 18 is blocked. Hence, the pilot flow passage change-over solenoid valve 81, 85 connects the neutral flow passage 7, 18 or the sub-pilot flow passage 95 to the pilot flow passage 11, 22 selectively.

The pressure reducing valve 80, 84 is provided in the sub-pilot flow passage 95 between the pilot pump 96 and the pilot flow passage change-over solenoid valve 81, 85. The reason for providing the pressure reducing valve 80, 84 between the pilot pump 96 and the pilot flow passage change-over solenoid valve 81, 85 is to stabilize the pilot pressure supplied from the pilot pump 96. Similarly to the first embodiment, the pilot pressure reduced by the pressure reducing valves 80, 84 is set lower than the pilot pressure required when the first and second main pumps 71, 72 discharge the standby flow.

Similarly to the first embodiment, when the actuators connected to the respective operation valves 2 to 6, 14 to 17 are operative, the controller 90 holds the neutral flow passage change-over solenoid valves 10, 21, solenoid valves 58, 59, and pilot flow passage change-over solenoid valves 81, 85 in their normal positions such that the solenoids thereof are not excited. Accordingly, the pressure in the neutral flow passages 7, 18 is led directly to the regulators 12, 23 and the first and second main pumps 71, 72 are maintained at the tilt angles for securing the flow required by the operation valves.

When the standby regeneration command signal is input through a manual operation by the operator while all of the operation valves 2 to 6, 14 to 17 are in the neutral position such that the actuators thereof are inoperative, on the other hand, the controller 90 controls the tilt angles of the first and second main pumps 71, 72 in accordance with the control flow shown in FIG. 2.

(Third Embodiment)

Figure 4:
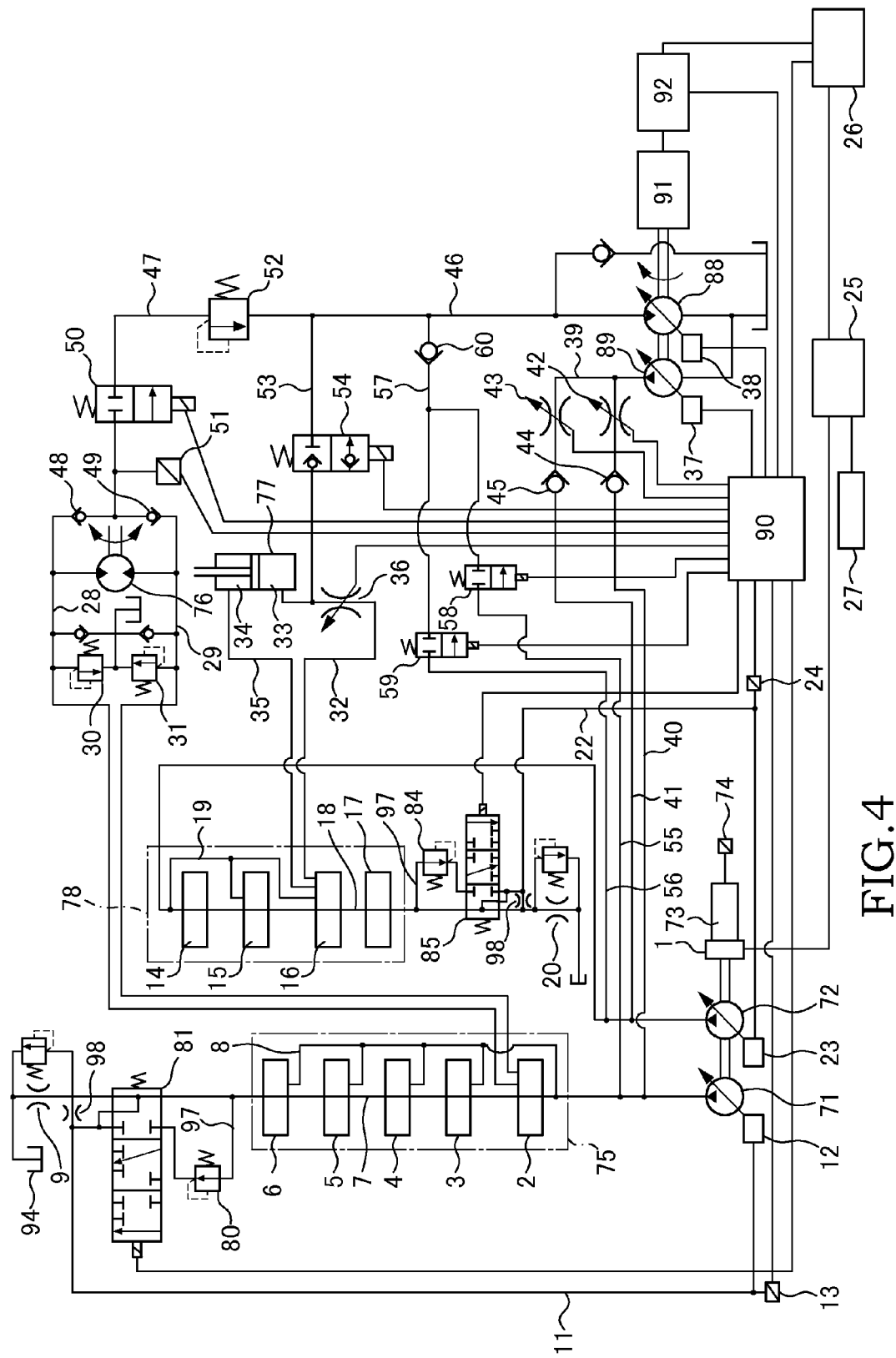
FIG. 4 is a circuit diagram of a control device for a hybrid construction machine according to a third embodiment of this invention.

Referring to FIG. 4, a third embodiment will be described. Differences with the first embodiment will be described below.

In the third embodiment, the pilot flow passage change-over solenoid valve 81, 85 is provided with the function of the neutral flow passage change-over solenoid valve 10, 21 of the first embodiment, and the throttle of the neutral flow passage change-over solenoid valve 10, 21 is provided on the exterior of the pilot flow passage change-over solenoid valve 81, 85 as a throttle 98. Further, a parallel flow passage 97 is connected parallel to the neutral flow passage 7, 18, and the pressure reducing valve 80, 84 is provided in the parallel flow passage 97. All other constitutions are identical to their counterparts in the first embodiment and description thereof has been omitted.

The pilot flow passage change-over solenoid valve 81, 85 is capable of switching between first to third positions. In the first position, which serves as a normal position, the pilot flow passage change-over solenoid valve 81, 85 connects the neutral flow passage 7, 18 to the throttle 9, 20 and the pilot flow passage 11, 22. The pilot flow passage 11, 22 is connected to the neutral passage 7, 18 between the pilot flow passage change-over solenoid valve 81, 85 and the throttle 9, 20, and the throttle 98 is provided in the pilot flow passage 11, 22. When the pilot flow passage change-over solenoid valve 81, 85 is in the first position, the neutral flow passage 7, 18 is connected to a downstream side of the throttle 98. The throttle 98 performs an identical function to the throttle of the neutral flow passage change-over solenoid valve 10, 21 according to the first embodiment.

When the pilot flow passage change-over solenoid valve 81, 85 is in the second position, communication between the neutral flow passage 7, 18 and the throttle 9, 20 is blocked, and the neutral flow passage 7, 18 is connected to the downstream side of the throttle 98 in the pilot flow passage 11, 22. In the third position, communication between the neutral flow passage 7, 18 and the throttle 9, 20 is blocked and the parallel flow passage 97 is connected to the downstream side of the throttle 98 in the pilot flow passage 11, 22 such that the pilot pressure in the pilot flow passage 11, 22 is reduced by the pressure reducing valve 80, 84. Hence, the pilot flow passage change-over solenoid valve 81, 85 connects the neutral passage 7, 18 or the parallel flow passage 97 to the pilot flow passage 11, 22 selectively.

In the third embodiment, the pilot flow passage change-over solenoid valve 81, 85 is switched to the second position in the step 5 of the control flow shown in FIG. 2, switched to the third position in the step 8, and otherwise operated identically to that of the first embodiment.

According to the above description, the standby regeneration operation is performed when all of the operation valves 2 to 6, 14 to 17 of the first and second circuit systems 75, 78 are in the neutral position. However, the hydraulic motor 88 is rotated to perform the standby regeneration operation even when one of the first and second circuit systems 75, 78, or in other words either the operation valves 2 to 6 or the operation valves 14 to 17, is in the neutral position. In other words, the controller 90 sets the solenoid valve 58 in the open position on the basis of the pressure signal from the first pressure sensor 13 and sets the solenoid valve 59 in the open position on the basis of the pressure signal from the second pressure sensor 24. When oil discharged from one of the first and second main pumps 71, 72 is supplied to the hydraulic motor 88 in this manner, the power generator 91 is rotated by the driving force of the hydraulic motor 88 such that power is generated.

Further, the generator 1 provided in the engine 73 is connected to a battery charger 25 such that power generated by the generator 1 is charged to the battery 26 via the battery charger 25. The battery charger 25 is also capable of charging power to the battery 26 when connected to a normal household power supply 27. Hence, the battery charger 25 can be connected to an independent power supply.

In the first to third embodiments described above, when the actuator is inoperative and the rotation speed of the engine 73 is low, the tilt angles of the first and second main pumps 71, 72 are increased to increase the displacement volume per revolution, and as a result, charging can be performed efficiently even though the rotation speed of the engine 73 is low. FIGS. 1, 3 and 4 illustrating the embodiments also disclose a system in which charging is diversified and charged power is used. This system will be described below.

Passages 28, 29 communicating with the turning motor 76 are connected to an actuator port of the turning motor operation valve 2 and brake valves 30, 31 are connected respectively to the passages 28, 29. When the operation valve 2 is held in the neutral position, the actuator port is closed such that the turning motor 76 is maintained in a stopped condition.

When the operation valve 2 is switched in one direction while the turning motor 76 is in the stopped condition, one of the passages 28 is connected to the first main pump 71 and the other passage 29 communicates with a tank. As a result, working oil is supplied through the passage 28 such that the turning motor 76 rotates, and returning oil from the turning motor 76 is returned to the tank through the passage 29. When the operation valve 2 is switched in an opposite direction to the above direction, the passage 29 is connected to the first main pump 71 and the passage 28 communicates with the tank, and as a result, the turning motor 76 rotates in reverse.

While the turning motor 76 rotates, the brake valve 30 or 31 exhibits a function as a relief valve such that when the passage 28, 29 reaches or exceeds a set pressure, the brake valve 30, 31 opens, thereby holding the pressure in the passage 28, 29 at the set pressure. Further, when the operation valve 2 is returned to the neutral position while the turning motor 76 rotates, the actuator port of the operation valve 2 is closed. Even when the actuator port of the operation valve 2 is closed, the turning motor 76 continues to rotate by inertial energy, and therefore the turning motor 76 exhibits a pump action. At this time, a closed circuit is formed by the passages 28, 29, the turning motor 76, and the brake valves 30, 31, and the inertial energy is converted into thermal energy by the brake valves 30, 31.

Meanwhile, when the operation valve 16 is switched in one direction from the neutral position, the working oil discharged from the second main pump 72 is supplied to a piston side chamber 33 of the boom cylinder 77 through a passage 32 while return oil from a rod side chamber 34 is returned to the tank through a passage 35, and as a result, the boom cylinder 77 is caused to expand. When the operation valve 16 is switched in an opposite direction to the above direction, the working oil discharged from the second main pump 72 is supplied to the rod side chamber 34 of the boom cylinder 77 through the passage 35 while return oil from the piston side chamber 33 is returned to the tank through the passage 32, and as a result the boom cylinder 77 is caused to contract. The boom two-speed operation valve 3 switches in conjunction with the operation valve 16. A proportional solenoid valve 36, an opening of which is controlled by the controller 90, is provided in the passage 32 connecting the piston side chamber 33 of the boom cylinder 77 to the operation valve 16. The proportional solenoid valve 36 is held in a fully open position in a normal condition.

Next, a variable volume sub-pump 89 that assists the output of the first and second main pumps 71, 72 will be described. The sub-pump 89 is rotated by driving force obtained when the power generator 91 is used as an electric motor, and the hydraulic motor 88 is rotated coaxially therewith by the driving force of the electric motor 91 (power generator 91). The battery 26 is connected to the electric motor 91 via the inverter 92, and the rotation speed and so on of the electric motor 91 is controlled by the controller 90 connected to the inverter 92. Further, tilt angles of the sub-pump 89 and the hydraulic motor 88 are controlled by tilt angle controllers 37, 38, and the tilt angle controllers 37, 38 are controlled by output signals from the controller 90.

A discharge passage 39 is connected to the sub-pump 89. The discharge passage 39 bifurcates into a first assist flow passage 40 that converges with a discharge side of the first main pump 71 and a second assist flow passage 41 that converges with a discharge side of the second main pump 72. First and second solenoid proportional throttle valves 42, 43, openings of which are controlled by output signals from the controller 90, are provided in the first and second assist flow passages 40, 41, respectively. Further, check valves 44, 45 that allow the working oil to flow only from the sub-pump 89 to the first and second main pumps 71, 72 are provided respectively in the first and second assist flow passages 40, 41 downstream of the first and second solenoid proportional throttle valves 42, 43.

A connecting passage 46 is connected to the hydraulic motor 88. The connecting passage 46 is connected to the passages 28, 29, which are connected to the turning motor 76, via an introduction passage 47 and check valves 48, 49. A change-over solenoid valve 50 that is open/close-controlled by the controller 90 is provided in the introduction passage 47. Further, a pressure sensor 51 that detects a pressure generated as the turning motor 76 turns or a pressure generated during braking is provided between the change-over solenoid valve 50 and the check valves 48, 49, and a pressure signal from the pressure sensor 51 is output to the controller 90.

A safety valve 52 that leads the working oil into the connecting passage 46 when the pressure in the introduction passage 47 reaches a predetermined pressure is provided in the introduction passage 47 downstream of the change-over solenoid valve 50. The safety valve 52 is provided to prevent so-called runaway from occurring in the turning motor 76 by maintaining the pressure in the passages 28, 29 when a malfunction occurs in the introduction passage 47 system, for example in the change-over solenoid valve 50 or the like.

An introduction passage 53 that communicates with the connecting passage 46 is provided between the boom cylinder 77 and the proportional solenoid valve 36. A solenoid open/ close valve 54 that is open/close-controlled by the controller 90 is provided in the introduction passage 53.

Next, a case in which an assisting force of the sub-pump 89 is used will be described. An assist flow of the sub-pump 89 is set in advance, and the controller 90 executes control of the tilt angle of the sub-pump 89, the tilt angle of the hydraulic motor 88, the rotation speed of the electric motor 91, and so on after determining respective control values at which optimum efficiency is obtained.

When one of the operation valves in the first circuit system 75 or the second circuit system 78 is switched, the neutral flow passage switch solenoid valves 10, 21 are switched from the throttle position to the open position. As a result, the pilot pressure in the pilot flow passages 11, 22 decreases and a signal indicating the decreased pilot pressure is output to the controller 90 via the first and second pressure sensors 13, 24. The controller 90 switches the solenoid valves 58, 59 to the closed position on the basis of the pilot pressure signal from the first and second pressure sensors 13, 24. The displacement volume per revolution of the first and second main pumps 71, 72 increases in accordance with the reduced pilot pressure, and therefore the full discharge amounts of the first and second main pumps 71, 72 are supplied to the actuators connected to the first and second circuit systems 75, 78.

When the displacement volume per revolution of the first and second main pumps 71, 72 increases, the controller 90 keeps the electric motor 91 in a rotating condition. The power stored in the battery 26 serves as a drive source of the electric motor 91, and since a part of this power is stored using the working oil discharged from the first and second main pumps 71, 72, extremely favorable energy efficiency is obtained. When the sub-pump 89 is rotated using the driving force of the electric motor 91, an assist flow is discharged from the sub-pump 89. The controller 90 controls the openings of the first and second solenoid proportional throttle valves 42, 43 in accordance with the pressure signals from the first and second pressure sensors 13, 24, and distributes the discharge amount of the sub-pump 89 proportionally to the first and second circuit systems 75, 78.

Meanwhile, when the operation valve 2 is switched in one direction in order to drive the turning motor 76 connected to the first circuit system 75, the passage 28 communicates with the first main pump 71 and the passage 29 communicates with the tank, whereby the turning motor 76 rotates. A turning pressure generated at this time is held at the set pressure of the brake valve 30. When the operation valve 2 is switched in an opposite direction to the above direction, on the other hand, the passage 29 communicates with the first main pump 71 and the passage 28 communicates with the tank, whereby the turning motor 76 rotates. The turning pressure generated at this time is held at the set pressure of the brake valve 31. Further, when the operation valve 2 is switched to the neutral position while the turning motor 76 turns, a closed circuit is formed by the passages 28, 29, and as a result, the brake valve 30 or 31 maintains a brake pressure of the closed circuit such that inertial energy is converted into thermal energy.

When the pressure in the passages 28, 29 is not held at the pressure required for a turning operation or a braking operation, it becomes impossible to turn the turning motor 76 and apply a brake. Therefore, to maintain the pressure in the passages 28, 29 at the turning pressure or the braking pressure, the controller 90 controls a load of the turning motor 76 while controlling the tilt angle of the hydraulic motor 88. In other words, the controller 90 controls the tilt angle of the hydraulic motor 88 such that the pressure detected by the pressure sensor 51 is substantially equal to the turning pressure of the turning motor 76 or the braking pressure.

When the working oil is supplied to the hydraulic motor 88 through the introduction passage 47 and the connecting passage 46 such that a rotary force is obtained by the hydraulic motor 88, the obtained rotary force acts on the electric motor 91 that rotates coaxially therewith. The rotary force of the hydraulic motor 88 acts on the electric motor 91 as an assisting force. Hence, the power consumed by the electric motor 91 can be reduced by an amount corresponding to the rotary force of the hydraulic motor 88. Furthermore, a rotary force of the sub-pump 89 can be assisted by the rotary force of the hydraulic motor 88, and in this case, the hydraulic motor 88 and the sub-pump 89 exhibit a pressure conversion function in conjunction with each other.

The pressure of the working oil that flows into the connecting passage 46 is often lower than a pump discharge pressure. In order to maintain the high discharge pressure of the sub-pump 89 using this low pressure, the hydraulic motor 88 and the sub-pump 89 are caused to exhibit a boost function. In other words, the output of the hydraulic motor 88 is determined by a product of a displacement volume per revolution $Q1$ and a pressure $P1$ at that time. Further, the output of the sub-pump 89 is determined by a product of a displacement volume per revolution $Q2$ and a discharge pressure $P2$ at that time. Since the hydraulic motor 88 and the sub-pump 89 rotate coaxially, $Q1 \times P1 = Q2 \times P2$ is established. Hence, assuming that the displacement volume $Q1$ of the hydraulic motor 88 is three times the displacement volume $Q2$ of the sub-pump 89, or in other words that $Q1=3Q2$, for example, the above equation becomes $3Q2 \times P1 = Q2 \times P2$. When both sides of the equation are divided by $Q2$, $3P1=P2$ is established. Hence, by varying the tilt angle of the sub-pump 89 to control the displacement volume $Q2$, a predetermined discharge pressure can be maintained in the sub-pump 89 using the output of the hydraulic motor 88. In other words, oil pressure from the turning motor 76 can be boosted and then discharged from the sub-pump 89.

As described above, the tilt angle of the hydraulic motor 88 is controlled to maintain the pressure in the passages 28, 29 at the turning pressure or the braking pressure. Therefore, in a case where the oil pressure from the turning motor 76 is used, the tilt angle of the hydraulic motor 88 must be fixed. In order to exhibit the pressure conversion function once the tilt angle of the hydraulic motor 88 has been fixed, the tilt angle of the sub-pump 89 is controlled. When the pressure in the connecting passage 46 system falls below the turning pressure or the braking pressure for some reason, the controller 90 closes the change-over solenoid valve 50 on the basis of the pressure signal from the pressure sensor 51 so that the turning motor 76 is not affected. Further, when pressure oil leaks into the connecting passage 46, the safety valve 52 is activated to ensure that the pressure in the passage 28, 29 does not decrease excessively, and therefore runaway is prevented from occurring in the turning motor 76.

Next, control of the boom cylinder 77 will be described. When the operation valve 16 is switched to activate the boom cylinder 77, an operation direction and an operation amount of the operation valve 16 are detected by a sensor (not shown) provided in the operation valve 16 and a corresponding operation signal is output to the controller 90.

In accordance with the operation signal from the sensor, the controller 90 determines whether an operator wishes to raise or lower the boom cylinder 77. When the controller 90 determines that the boom cylinder 77 is to be raised, the controller 90 maintains the proportional solenoid valve 36 in the normal fully open position. At this time, the controller 90 maintains the solenoid open/close valve 54 in the closed position, and controls the rotation speed of the electric motor 91 and the tilt angle of the sub-pump 89.

When the controller 90 determines that the boom cylinder 77 is to be lowered, on the other hand, the controller 90 calculates a lowering speed of the boom cylinder 77 desired by the operator in accordance with the operation amount of the operation valve 16, and switches the solenoid open/close valve 54 to the open position by closing the proportional solenoid valve 36. As a result, an entire amount of return oil from the boom cylinder 77 is supplied to the hydraulic motor 88. However, when the flow consumed by the hydraulic motor 88 is smaller than a flow required to maintain the lowering speed desired by the operator, the boom cylinder 77 cannot maintain the lowering speed desired by the operator. At this time, the controller 90 maintains the lowering speed of the boom cylinder 77 desired by the operator by controlling the opening of the proportional solenoid valve 36 on the basis of the operation amount of the operation valve 16, the tilt angle of the hydraulic motor 88, the rotation speed of the electric motor 91, and so on such that a flow equal to or greater than the flow consumed by the hydraulic motor 88 is returned to the tank.

When pressure oil is supplied to the hydraulic motor 88, the hydraulic motor 88 rotates, and a resulting rotary force acts on the electric motor 91 that rotates coaxially therewith. The rotary force of the hydraulic motor 88 acts on the electric motor 91 as an assisting force. Hence, the power consumed by the electric motor 91 can be reduced by an amount corresponding to the rotary force of the hydraulic motor 88. On the other hand, power need not be supplied to the electric motor 91, and instead, the sub-pump 89 may be rotated by the rotary force of the hydraulic motor 88 alone. In this case, the hydraulic motor 88 and the sub-pump 89 exhibit the pressure conversion function.

Next, a case in which the turning operation of the turning motor 76 and the lowering operation of the boom cylinder 77 are performed simultaneously will be described. When the boom cylinder 77 is lowered while turning the turning motor 76, the pressure oil from the turning motor 76 and the return oil from the boom cylinder 77 are supplied to the hydraulic motor 88 after converging in the connecting passage 46. Even if the pressure in the introduction passage 47 rises above the turning pressure of the turning motor 76 or the braking pressure at this time, the check valves 48, 49 ensure that the turning motor 76 is not affected. Further, when the pressure on the connecting passage 46 side falls below the turning pressure or the braking pressure, the controller 90 closes the change-over solenoid valve 50 on the basis of the pressure signal from the pressure sensor 51.

Hence, when the turning operation of the turning motor 76 and the lowering operation of the boom cylinder 77 are performed simultaneously, the tilt angle of the hydraulic motor 88 can be determined using the required lowering speed of the boom cylinder 77 as a reference, regardless of the turning pressure and the braking pressure. In all cases, the output of the sub-pump 89 can be assisted by the output of the hydraulic motor 88, and the working oil discharged from the sub-pump 89 can be supplied to the first and second circuit systems 75, 78 after being distributed proportionally to the first and second solenoid proportional throttle valves 42, 43.

When the electric motor 91 is used as a power generator in which the hydraulic motor 88 is employed as a drive source, the tilt angle of the sub-pump 89 is set at zero such that the sub-pump 89 substantially enters a no load state. As long as the output required to rotate the electric motor 91 is maintained in the hydraulic motor 88, the power generator 91 can be caused to function using the output of the hydraulic motor 88. Furthermore, power generation can be performed in the generator 1 using the output of the engine 73, and power generation can be performed in the power generator 91 using the hydraulic motor 88.

This system is provided with the check valves 44, 45, the change-over solenoid valve 50, the solenoid open/close valve 54, and the solenoid valves 58, 59, and therefore, even if a malfunction occurs in the system of the hydraulic motor 88 and the sub-pump 89, for example, the system of the first and second main pumps 71, 72 can be separated hydraulically from the system of the hydraulic motor 88 and the sub-pump 89. In particular, the change-over solenoid valve 50, the solenoid open/close valve 54, and the solenoid valves 58, 59 are held in the closed position by the spring force of the spring in a normal condition whereas the proportional solenoid valve 36 is held in the fully open position in a normal condition, and therefore the system of the first and second main pumps 71, 72 can be separated hydraulically from the system of the hydraulic motor 88 and the sub-pump 89 even if a malfunction occurs in the electric system.

This invention is not limited to the embodiments described above and may be subjected to various amendments and modifications within the scope of the technical spirit thereof, such amendments and modifications also being included in the technical scope of this invention.

With respect to the above description, the contents of application No. 2009-113856, with a filing date of May 8, 2009 in Japan, are incorporated herein by reference.

Industrial Applicability

This invention may be used in a construction machine such as a power shovel.

The invention claimed is:
1. A control device for a hybrid construction machine, comprising:
 a variable volume pump;
 a plurality of operation valves for controlling a flow of a discharged oil that is led from the variable volume pump to respective actuators;
 a neutral flow passage for leading the discharged oil from the variable volume pump to a tank when the operation valves are in a neutral position;
 a pilot pressure generating throttle provided in the neutral flow passage on a downstream side of the operation valves;
 a pilot flow passage into which a pressure generated on an upstream side of the pilot pressure generating throttle is led;
 a regulator for performing control such that a tilt angle of the variable volume pump increases as a pilot pressure in the pilot flow passage decreases;
 an operation condition detector for detecting an operation condition of the operation valves;
 a regenerative hydraulic motor rotated by the discharged oil from the variable volume pump;
 a solenoid valve for opening and closing a flow passage connecting the variable volume pump to the hydraulic motor;
 a power generator connected to the hydraulic motor;
 a pilot flow passage change-over solenoid valve for switching the neutral flow passage and the pilot flow passage between a communicating state and a blocked state;
 a pressure reducing valve for reducing the pilot pressure led to the regulator through the pilot flow passage when the neutral flow passage and the pilot flow passage are blocked by the pilot flow passage change-over solenoid valve; and a controller that determines whether or not all of the operation valves are in the neutral position on the basis of a detection result from the operation condition detector, and when all of the operation valves are determined to be in the neutral position, supplies the discharged oil from the variable volume pump to the hydraulic motor by setting the solenoid valve in an open position and sets the pilot flow passage change-over solenoid valve in a blocking position.

2. The control device for a hybrid construction machine as defined in claim 1, wherein the pressure reducing valve and the pilot flow passage change-over solenoid valve are provided in parallel in the pilot flow passage.

3. The control device for a hybrid construction machine as defined in claim 1, further comprising:

a sub-pilot flow passage connected to the pilot flow passage; and a pilot pressure source that supplies a pilot pressure oil to the pilot flow passage through the sub-pilot flow passage, wherein the pressure reducing valve is provided in the sub-pilot flow passage, and the pilot flow passage change-over solenoid valve connects the neutral flow passage or the sub-pilot flow passage to the pilot flow passage selectively.

4. The control device for a hybrid construction machine as defined in claim 1, further comprising a parallel flow passage connected in parallel to the neutral flow passage and provided with the pressure reducing valve, wherein the pilot flow passage change-over solenoid valve connects the neutral flow passage or the parallel flow passage to the pilot flow passage selectively.

5. The control device for a hybrid construction machine as defined in claim 1, further comprising a neutral flow passage change-over solenoid valve that is provided in the neutral flow passage upstream of the pilot pressure generating throttle and is capable of switching between a throttle position and a fully open position, wherein the controller sets the neutral flow passage change-over solenoid valve in the throttle position when all of the operation valves are determined to be in the neutral position.

6. The control device for a hybrid construction machine as defined in claim 1, further comprising:

a prime mover for driving the variable volume pump; and a rotation speed detector for detecting a rotation speed of the prime mover, wherein the controller supplies the discharged oil from the variable volume pump to the hydraulic motor by setting the solenoid valve in an open position when all of the operation valves are determined to be in the neutral position, and sets the pilot flow passage change-over solenoid valve in a blocking position when all of the operation valves are determined to be in the neutral position and the rotation speed detected by the rotation speed detector is equal to or lower than a predetermined set rotation speed.

7. The control device for a hybrid construction machine as defined in claim 1, wherein the operation condition detector is a pressure detector for detecting the pressure in the pilot flow passage, and the controller determines that all of the operation valves are in the neutral position when the pressure detected by the pressure detector is equal to or greater than a predetermined set pressure.

* * * * *